June 21, 1966

D. H. CRISS ETAL 3,256,563

ADJUSTABLE EXTRUSION ORIFICE STRUCTURE

Filed Nov. 18, 1963

INVENTOR.
JAMES E. HEIDER
BY DONALD H. CRISS

Spencer L. Blaylock, Jr
O. A. Schaich
ATTORNEYS

June 21, 1966 D. H. CRISS ETAL 3,256,563
ADJUSTABLE EXTRUSION ORIFICE STRUCTURE
Filed Nov. 18, 1963 3 Sheets-Sheet 2

INVENTOR.
JAMES E. HEIDER
BY DONALD H. CRISS
ATTORNEYS

June 21, 1966   D. H. CRISS ETAL   3,256,563
ADJUSTABLE EXTRUSION ORIFICE STRUCTURE
Filed Nov. 18, 1963   3 Sheets-Sheet 3
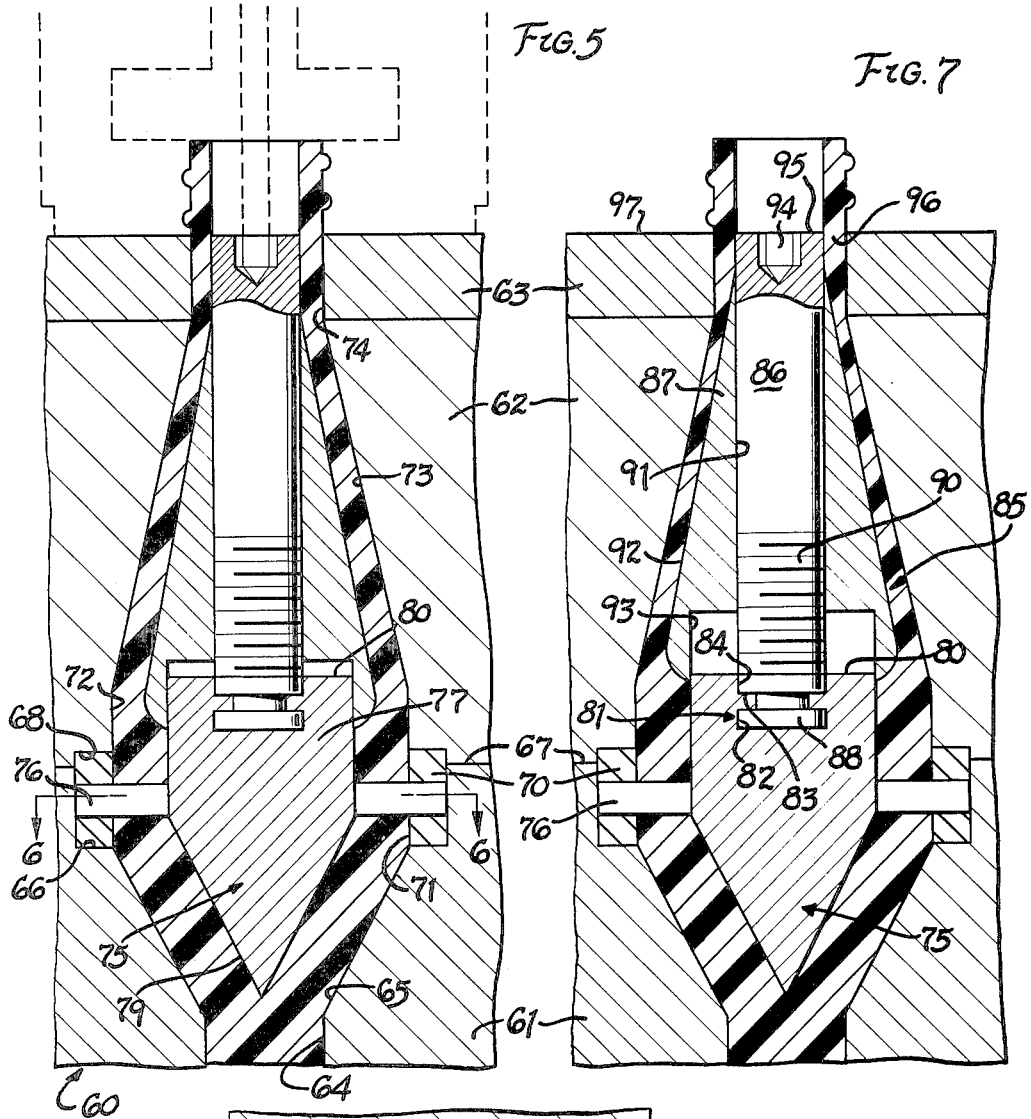
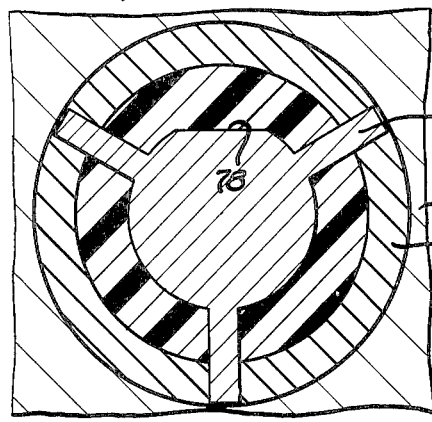
INVENTORS
JAMES E. HEIDER
BY DONALD H. CRISS
ATTORNEYS ial is accumulated. Thus, the normal operation of the plasticizer-extruder does not result in the displacement of plasticized material through the orifice.

United States Patent Office 3,256,563
Patented June 21, 1966

3,256,563
ADJUSTABLE EXTRUSION ORIFICE STRUCTURE
Donald H. Criss and James E. Heider, Toledo, Ohio, assignors to Owens-Illinois Glass Company, a corporation of Ohio
Filed Nov. 18, 1963, Ser. No. 324,277
5 Claims. (Cl. 18—14)

The present invention relates to apparatus for making plastic articles. More particularly, the present invention relates to an apparatus for the manufacture of plastic articles including an extrusion orifice to which plasticized material is furnished for expression therethrough, the orifice being adjustable so as to be capable of performing a valving function.

In the co-pending, earlier filed application of Charles E. Plymale and James E. Heider, Serial No. 314,126, filed in the United States Patent Office on October 7, 1963, and assigned to the assignee of the present invention, there is disclosed a method of making a plastic article, the method including the accumulation of plasticized plastic material in free communication with an extrusion orifice. By utilization of this method, heat sensitive thermoplastic materials may be intermittently issued through the extrusion orifice without the danger of thermal degradation of the materials. Such accumulation of the plasticized material is rendered possible by interposing in the flow path of the plasticized material an obstruction capable of performing a valving function, the obstruction or restriction creating a pressure drop in the path of flow of the accumulated material to the orifice of such a value that the pressure drop at the obstruction is greater than the pressure at which the material is accumulated. Thus, the normal operation of the plasticizer-extruder does not result in the displacement of plasticized material through the orifice.

The present invention now proposes a new and novel orifice structure for utilization in conjunction with such a method, the orifice structure providing the obstruction or restriction in the material flow path. More particularly, the present invention provides an adjustable orifice structure whereby the pressure drop interposed in the path of flow of plasticized material from a plasticizer-extruder to an extrusion orifice may be varied and/or regulated to provide a desired, predetermined pressure drop. Thus, the orifice structure of the present invention provides a means whereby the flow of plasticized material from a plasticizer-extruder through an outlet orifice can be readily regulated or controlled without the utilization of any extraneous valving mechanism.

Structurally, the present invention includes an orifice block having a passage therethrough connected at one end to a plasticizer-extruder and defining an outlet orifice at the other end thereof. A mandrel is supported in this passage for movement relative to the passage. The passage and the mandrel are provided with complementary tapered surfaces which cooperate to determine a flow path for the plasticized material, which flow path presents a restriction to the flow of plasticized material.

By supporting the mandrel in the orifice block passage for relative movement therein, the size of this flow path may be regulated to vary the restriction and, thereby, to vary the pressure drop between the plasticizer-extruder and the outlet orifice. In this manner, the orifice structure, per se, performs a valving function by imposing a threshold value required for the issuance of material through the extrusion orifice, this threshold value being dependent upon the relative position of the mandrel in the surrounding orifice block.

It is, therefore, an important object of the present invention to provide a new and improved orifice structure for the issuance of plasticized material.

Another important object of the present invention is the provision of an improved orifice structure through which plasticized material can be issued and capable of performing a valving function for controlling the flow of plasticized material therethrough.

A further object of this invention is the provision of an improved orifice structure through which plasticized material can be issued whenever the plasticized material is subjected to a pressure in excess of a threshold pressure determined by the extent of a valving passage defined interiorly of the orifice by a displaceable mandrel element.

It is yet a further, and no less important, object of the present invention to provide an orifice structure including an orifice block provided with a passage therein having a tapered valving portion and a displaceable mandrel disposed interiorly of the passage and provided with a complementary tapered portion cooperable with the passage portion to define a variable flow restriction to the passage of plasticized material.

Other objects of this invention will appear in the following description and appended claims, reference being had to the accompanying drawings forming a part of this specification wherein like reference characters designate corresponding parts in the several views.

On the drawings:

FIGURE 5 is a view similar to FIGURES 2 and 4, but illustrating still another orifice structure of the present invention;

FIGURE 6 is a sectional view taken along the plane 6—6 of FIGURE 5; and

FIGURE 7 is a view similar to FIGURE 5, but illustrating the device in an adjusted position.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

Figure 1:
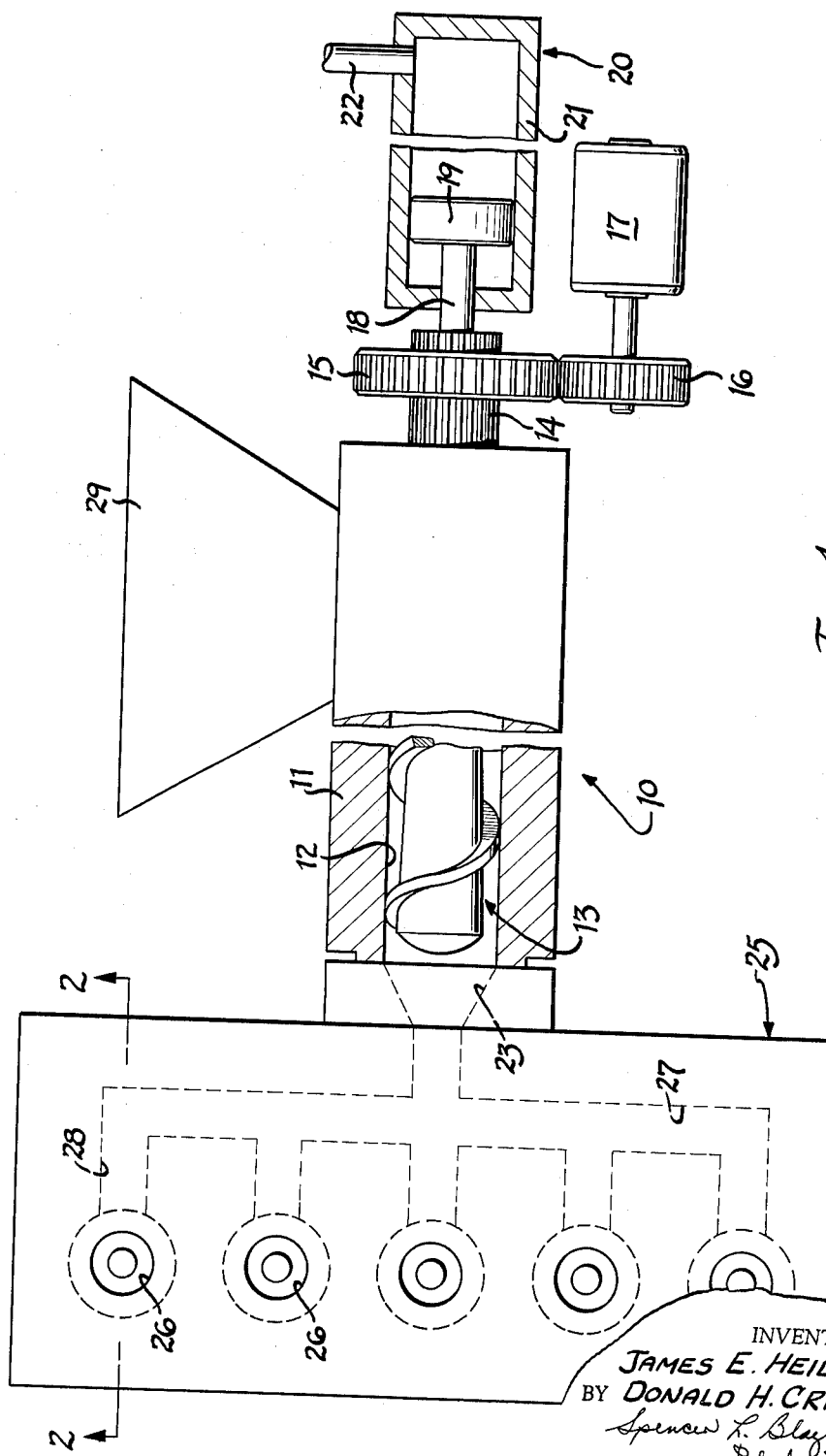
FIGURE 1 is a somewhat schematic representation of a plasticizer-extruder capable of supplying plasticized material to a plurality of orifices of the present invention.

As shown on the drawings:

In FIGURE 1 reference numeral 10 refers generally to a plastic forming machine including a plasticizer-extruder barrel 11 having a cylindrical passage 12 therethrough within which is disposed a rotatable and axially displaceable plasticizer-extruder screw 13. The screw 13 is provided at its rear end with a splined extension 14 upon which is mounted a drive gear 15 driven by a gear 16 rotated by a prime mover, such as an electric motor 17. This splined extension 14 is provided with a further extension 18 secured to a piston 19 of a single acting fluid motor 20. The cylinder 21 of the fluid motor 20 is adapted to receive fluid under pressure from a suitable source, as through a conduit 22.

Plasticized thermoplastic material from the barrel bore 12 is supplied through a passage 23 to an orifice block, indicated generally at 25. A plurality of orifices 26 are provided in the orifice block 25, the orifices 26 each being connected to the tapered passage 23 by means of a transverse supply passage 27 and individual orifice passages 28.

The plasticizer-extruder barrel 11 is adapted to receive pelletized or other solid plasticized material from an overhead hopper 29, the screw 13 being rotated by the drive gears 15 and 16, and the barrel 11 being heated by external heaters (not shown) to reduce the pelletized material to a plasticized form by the time the material issues from the leading end of the screw 13. The screw 13 is reciprocable by means of the fluid motor 20 to displace this material from the barrel passage 12 under a pressure in excess of that generated by rotation of the screw 13, in the manner described in the above identified application of Charles E. Plymale and James E. Heider.

Figure 2:
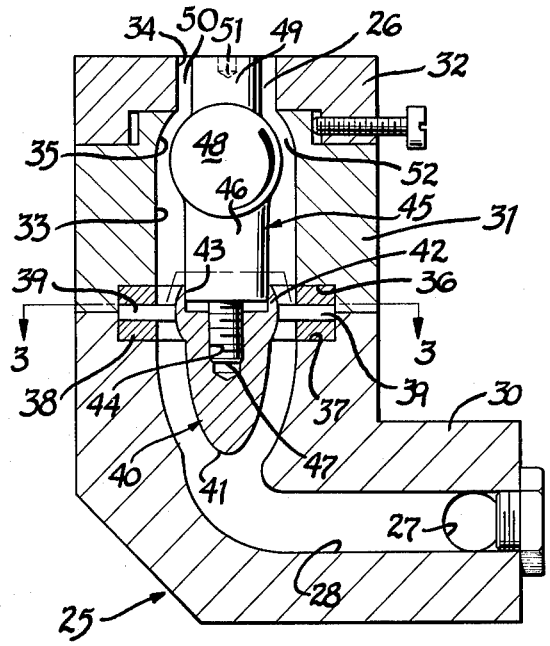
FIGURE 2 is a sectional view taken along the plane 2—2 of FIGURE 1, and illustrating a first form of orifice of the present invention.

As illustrated in FIGURE 2 of the drawings, the orifice block 25 comprises a lower juncture block 30 in which the transverse passages 27 and the individual supply passages 28 are formed, a superimposed valving block 31 and an upper orifice bushing 32.

The orifice block passage 28, entering the juncture block 30 laterally, merges into an upper, vertical passage 33 which, in turn, merges into a terminal cylindrical orifice passage 34 through a tapered valving portion 35. This tapered valving portion 35 is defined in the valving block 31 and actually is partially hemispherical in shape.

The valving block 31 is provided with a downwardly opening recess 36 registering with an upwardly opening recess 37 in the juncture block 30 to receive therebetween a cylindrical spider collar 38 having a plurality of radial pins 39 supporting a centrally located carrier, indicated generally at 40. This carrier 40 is supported by the pins 39 in the vertical passage 33, the carrier having a lower streamlined nose portion 41 and an upper cylindrical portion 42 provided with an axial, upwardly opening recess 43 communicating with a centrally located threaded recess 44 depending into the body of the carrier 40.

Mounted upon and carried by the carrier 40 is a mandrel indicated generally at 45, and comprising a lower cylindrical portion 46, the lower end of which is snugly received in the recess 43, and a terminal depending threaded projection 47 threaded into the recess 44. A medial, hemispherical projection 48 is provided on the mandrel 45, the mandrel terminating in an upper cylindrical embossment 49 projecting through the orifice block bore 34, exterior surface of the embossment 49 and the bore 34 defining therebetween the extrusion orifice 26.

The upper terminal surface of the embossment 49 is provided with an interior, polygonal recess 51, adapted to receive a tool whereby the mandrel 45 may be rotated relative to the fixed carrier 40, the threads 47 of the mandrel and recess 44 of the carrier 40 cooperating to axially shift the location of the mandrel as it is rotated. Of course, such axial shifting of the mandrel will change the location of the hemispherical portion 48 of the mandrel and the hemispherical tapered surface 35 of the valving block 31, this spacing being indicated generally at 52.

The spacing 52 thus provides a restriction in the flow of plasticized material from the screw 13, through the passage 23, the passages 27 and 28, the passage 33 and through the orifice block bore 34 for issuance at the orifice 50. The restriction 52 imposes a pressure drop in the flow of plasticized material. In accordance with the disclosure of the co-pending application of Charles E. Plymale and James H. Heider, above referred to, this pressure drop preferably is greater than the normal output pressure of the screw 13. Accordingly, plasticized material will be accumulated between the passage 52 and the exit end if the screw 13 during rotation of the screw, the screw being urged rearwardly against a relatively low normal pressure maintained in the fluid motor 20 to accommodate the accumulation of such a body of material.

After the body of material has been accumulated, relatively high pressure is introduced through the conduit 22 into the fluid motor 20 to displace the piston 19 to the left, thus simultaneously displacing the screw 13 to the left to subject the accumulated material to a pressure greater than that normally generated by rotation of the screw. This additional pressure to which the material is subjected will force the material through the orifice block passages and issue the material through the orifice 50.

By varying the spacing between the tapered portion 48 of the mandrel and the correspondingly tapered portion 35 of the orifice block passage, the size of the passageway 52 can be regulated and the degree of pressure drop between the screw 13 and the orifice 50 can be readily regulated.

Figure 4:
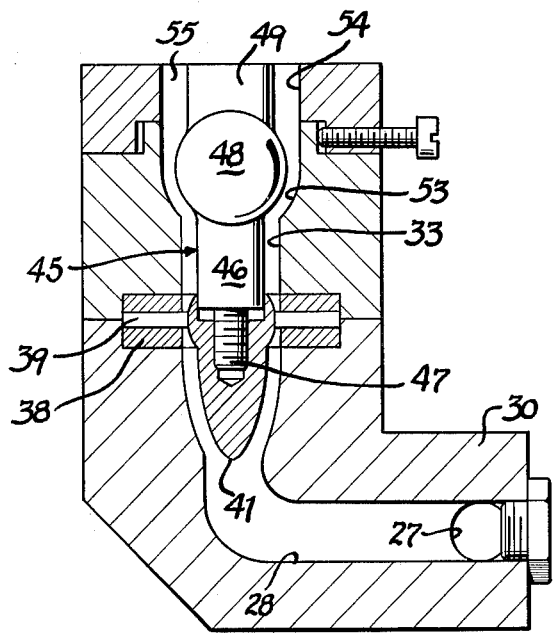
FIGURE 4 is a view similar to FIGURE 2, but illustrating a different form of the orifice of the present invention.
Figure 3:
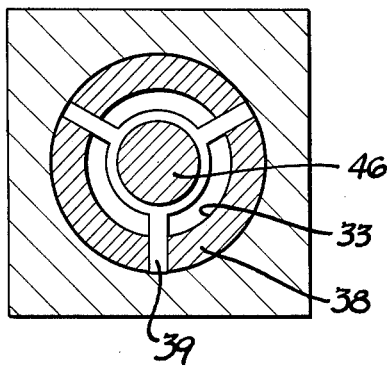
FIGURE 3 is a view taken along the plane 3—3 of FIGURE 2.

In that embodiment of the invention illustrated in FIGURE 4 of the drawings, reference numerals identical to those utilized in the embodiment of FIGURES 2 and 3 refer to identical portions of the apparatus.

FIGURE 4 differs from FIGURE 2 primarily in the fact that the valving block aperture 33 is provided with an upwardly enlarged tapered portion 53, rather than the upwardly restricted tapered portion 35 of FIGURE 2. The upwardly enlarged valving portion 53 merges smoothly with the radially enlarged orifice bushing bore 54 defining the outer extremity of a relatively larger orifice 55 defined between the bore 54 and the upper extremity 49 of the mandrel 40.

By virtue of the hemispherical portion 48 of the mandrel, an identical mandrel 40 can be utilized for either the upwardly restricted passage of FIGURE 2 or the upwardly enlarged passage of FIGURE 4. The operation of the device of FIGURE 4 is substantially identical with that of FIGURE 2, except that downwardly shifting the mandrel of FIGURE 4 increases the pressure drop at the restriction.

In the embodiment of the invention illustrated in FIGURE 5 of the drawings, reference numeral 60 refers generally to a modified form of orifice block consisting of a lower juncture block 61 corresponding to the juncture block 30 of the embodiment of FIGURES 2 and 3, a valving block 62 seated upon the juncture block 61 and an upper orifice block 63 corresponding to the orifice block 32 of the embodiment of FIGURE 2.

The juncture block 61 is provided with a passage 64 communicating with the exit end of a plasticizer-extruder, such as the plasticizer-extruder of FIGURE 1, and adapted to receive plasticized material therefrom. The passage 64 communicates with an upper generally frusto-conical recess 65 joined to an upwardly facing shoulder 66 recessed into the free upper surface 67 of the juncture block. The under surface of the valving block 62 is provided with a similar recess providing a downwardly facing shoulder 68.

Seated firmly between the shoulders 66, 68 is an annular spider collar 70 having an inner surface 71 smoothly registering with the upper extremity of the recess 65 and merging smoothly into the bore 72 of the valving block 62. The upper portion of the valving block bore 72 is generally frusto-conical, the bore surface 73 tapering upwardly and inwardly for full communication with an orifice bushing bore 74.

Mounted upon the collar 70 is a mandrel carrier, indicated generally at 75, the carrier being generally circular in exterior contour and being joined by radial supporting pins 76 to the collar. As best illustrated in FIGURE 6 of the drawings, the cylindrical upper portion 77 of the carrier 75 is provided with one flattened or chordal side 78 for a purpose to be hereinafter fully described.

The lower extremity of the carrier 75 is frusto-conical at its exterior surface, as at 79, to present a streamlined nose surface to the plasticized material flowing upwardly through the supply channel 64.

The upper surface 80 of the carrier is provided with a transverse groove, indicated generally at 81, and comprising a lower re-entrance groove 82, a medial inwardly directed flange 83, and an upper recess 84. The groove 81 serves to retain a mandrel, indicated generally at 85, in position upon the carrier 75, the mandrel consisting of an inner mandrel post 86 and an outer mandrel sleeve 87. The mandrel post 86 is provided with a lower, radially enlarged head 88 entrapped in the groove 86 beneath the groove flanges 83, the cylindrical post being snugly laterally confined in the upper recess 84 of the carrier 75.

The post 86 is exteriorly threaded, as at 90, and the sleeve bore 91 is similarly threaded for mating engagement therewith. The exterior surface 92 of the sleeve is frusto-conical in shape and conforms in slope to the slope of the orifice block bore 73. The lower extremity of the sleeve is recessed, as at 93, so that the sleeve telescopes over the carrier 75, the recess 93 conforming to the exterior surface of the upper portion 77 of the carrier and having one flattened side for full linear contact with the flattened side 78 of the carrier. The flattened portion 78 of the carrier and the correspondingly flattened side of the recess 93 support the sleeve 87 for telescopic axial movement relative to the carrier 75 and the post 86, while fixing the sleeve against rotational displacement. The post 86 is freely rotational relative to the carrier 75 about a vertical axis, a polygonal tool socket 94 being provided in the free upper extremity 95 of the post to facilitate rotation of the post.

A comparison of FIGURES 5 and 7 will readily indicate the axial or vertical adjustment of the sleeve 87 upon the post 86 as the post is rotated. Further, the upper extremity of the post cooperates with the orifice bushing bore 74 to define an extrusion orifice 96 and the post, being vertically fixed to the carrier 75, is retained against axial displacement. In this manner, the upper extremity 95 of the post is always flush with the upper extremity 97 of the orifice bushing 63.

The axial displacement of the sleeve 87 upon rotation of the post 86 will vary the spacing between the exterior surface 92 of the sleeve and the interior surface 73 of the valving block 62, this spacing determining the pressure drop between the plasticizer-extruder and the orifice 96 in the identical manner that the pressure drop in FIGURES 2 and 4 is determined by the positioning of the mandrel enlargement 48 relative to the surfaces 35, 53, respectively.

While several exemplary embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

I claim:

1. In an apparatus for extruding plasticized plastic material, the improvement of an extrusion orifice structure capable of performing a valving function, said structure comprising an orifice block assembly having a passage therethrough, said passage communicating at one end with a source of plasticized material and terminating at its other end in a cylindrical orifice bore, said passage having a medial portion of different cross section than said orifice bore and merging into said orifice bore through a tapered valving portion, a mandrel assembly concentrically disposed in said passage, and means supporting said mandrel assembly for telescopic movement relative to said block, said mandrel assembly including (1) a terminal cylindrical projection extending into said orifice bore to define an annular outlet orifice and (2) a tapered valving portion cooperable with the tapered valving portion of said passage to define a restricted material flow path therethrough, said flow path being interposed between the ends of said passage and of a cross sectional area which is variable as the mandrel is moved relative to said block, the valving portions of said mandrel assembly and said passage, respectively, imposing a variable pressure drop between said source and said outlet orifice, but without varying the size or shape of the outlet orifice.

2. In an apparatus as defined in claim 1, the further improvement of said mandrel assembly valving portion being at least partially spherical in configuration and said passage medial portion being of a conforming configuration.

3. In an apparatus as defined in claim 1 the further improvement of said mandrel assembly including a frustoconical sleeve adjustable toward and away from said bore and said orifice block passage also being frustoconical.

4. In an apparatus for extruding plasticized plastic material, an extrusion orifice structure comprising an orifice block having a passage therethrough, said passage communicating at one end with a source of plasticized material and terminating at its other end in a cylindrical orifice bore, said passage having a medial portion of different cross section than said orifice bore and merging into said orifice bore through a tapered valving portion, a supporting spider located in said passage, and a mandrel assembly concentrically disposed in said passage and threadedly interconnected with said spider, rotation of said mandrel assembly telescopically displacing the mandrel assembly in said block passage, said assembly having a tapered valving portion cooperable with the tapered valving portion of said passage to define a restricted material flow path therebetween, said assembly also having a cylindrical extension projecting into said orifice bore, said restricted flow path being interposed between the ends of said passage and of a cross sectional area which is variable as the mandrel is moved relative to said block without varying the size of the orifice opening defined by said bore and said mandrel assembly extension.

5. In an apparatus for extruding plasticized plastic material, an extrusion orifice structure comprising an orifice block assembly having a passage therethrough, said passage communicating at one end with a source of plasticized material and terminating at its other end in a cylindrical orifice bore, said passage having a medial tapered portion, a correspondingly tapered mandrel sleeve concentrically disposed in said passage, and a rotatable cylindrical mandrel post supporting said mandrel sleeve for telescopic movement relative to said block passage portion, said post projecting into said bore to define an annular and truly cylindrical dispensing orifice opening therebetween, said post and said sleeve being threadedly interconnected so that rotation of said mandrel post displaces the mandrel sleeve for cooperation with the tapered medial portion of said passage to define a restricted material flow path therebetween, said flow path being interposed between the ends of said passage and being of a cross sectional area which is variable as the mandrel sleeve is moved relative to said block, the area of said dispensing orifice opening being independent of variations in said cross sectional area of said flow path.

References Cited by the Examiner

UNITED STATES PATENTS

| | | | |
|---|---|---|---|
| Re. 24,577 | 12/1958 | Haines | 18—5 X |
| 1,484,961 | 2/1924 | Peelle. | |
| 2,210,004 | 8/1940 | Rautenstrauch | 18—14 X |
| 2,750,625 | 6/1956 | Colombo | 18—5 |
| 2,979,768 | 4/1961 | Nichols | 18—14 X |
| 3,054,143 | 9/1962 | Stenger | 18—5 X |

FOREIGN PATENTS

| | | |
|---|---|---|
| 208,367 | 8/1956 | Australia. |
| 918,946 | 2/1963 | Great Britain. |

WILLIAM J. STEPHENSON, *Primary Examiner.*

L. S. SQUIRES, *Assistant Examiner.*